United States Patent [19]

Gaeddert

[11] 4,422,373
[45] Dec. 27, 1983

[54] THROAT CONTROL APPARATUS IN AN OPEN THROAT, ROTARY BALER

[75] Inventor: Melvin V. Gaeddert, Newton, Kans.

[73] Assignee: Hesston Corporation, Hesston, Kans.

[21] Appl. No.: 297,969

[22] Filed: Aug. 31, 1981

[51] Int. Cl.³ .............................................. B30B 5/04
[52] U.S. Cl. ........................................ 100/88; 56/341
[58] Field of Search ................ 100/88, 89, 5; 56/341, 56/342, 343, 344

[56] References Cited

U.S. PATENT DOCUMENTS

| | | | |
|---|---|---|---|
| 799,175 | 9/1905 | Luebben et al. | 100/88 X |
| 3,269,098 | 8/1966 | Bushmeyer et al. | 100/89 X |
| 3,722,197 | 3/1973 | Vermeer | 100/88 X |
| 3,914,926 | 10/1975 | Braunberger et al. | 56/341 |
| 4,155,298 | 5/1979 | Gaeddert | 56/341 X |
| 4,252,057 | 2/1981 | Gaeddert et al. | 56/341 X |

*Primary Examiner*—Peter Feldman
*Attorney, Agent, or Firm*—Schmidt, Johnson, Hovey & Williams

[57] ABSTRACT

The baler has an internal chamber within which crop materials are coiled up into a cylindrical bale by oppositely moving belts which are looped around a pair of spaced apart guide rollers at the bottom of the chamber to define a wide-open, entrance throat to the chamber from the windrow pickup device of the baler. Located within the throat is a control gate positioned to partially span the throat and to prevent retrograde outflow of crop material during bale formation while permitting unobstructed inflow of material from the crop pickup device. When swung upwardly to its opened position, the gate permits incoming material to be fed upwardly in the chamber and acted upon by a generally upwardly moving belt thereof while preventing outflow of material being acted upon by a downwardly moving belt of the chamber. When swung down to its generally horizontal, closed position during the later stages of the bale formation as the enlarging bale comes to rest upon the gate, the short length of the gate relative to the throat dimensions permits material to continue to flow into the chamber in a generally rearward, horizontal direction beneath the forming bale while the closed gate continues to obstruct outflow promoted by the downwardly moving belt at the opposite side of the chamber.

10 Claims, 6 Drawing Figures

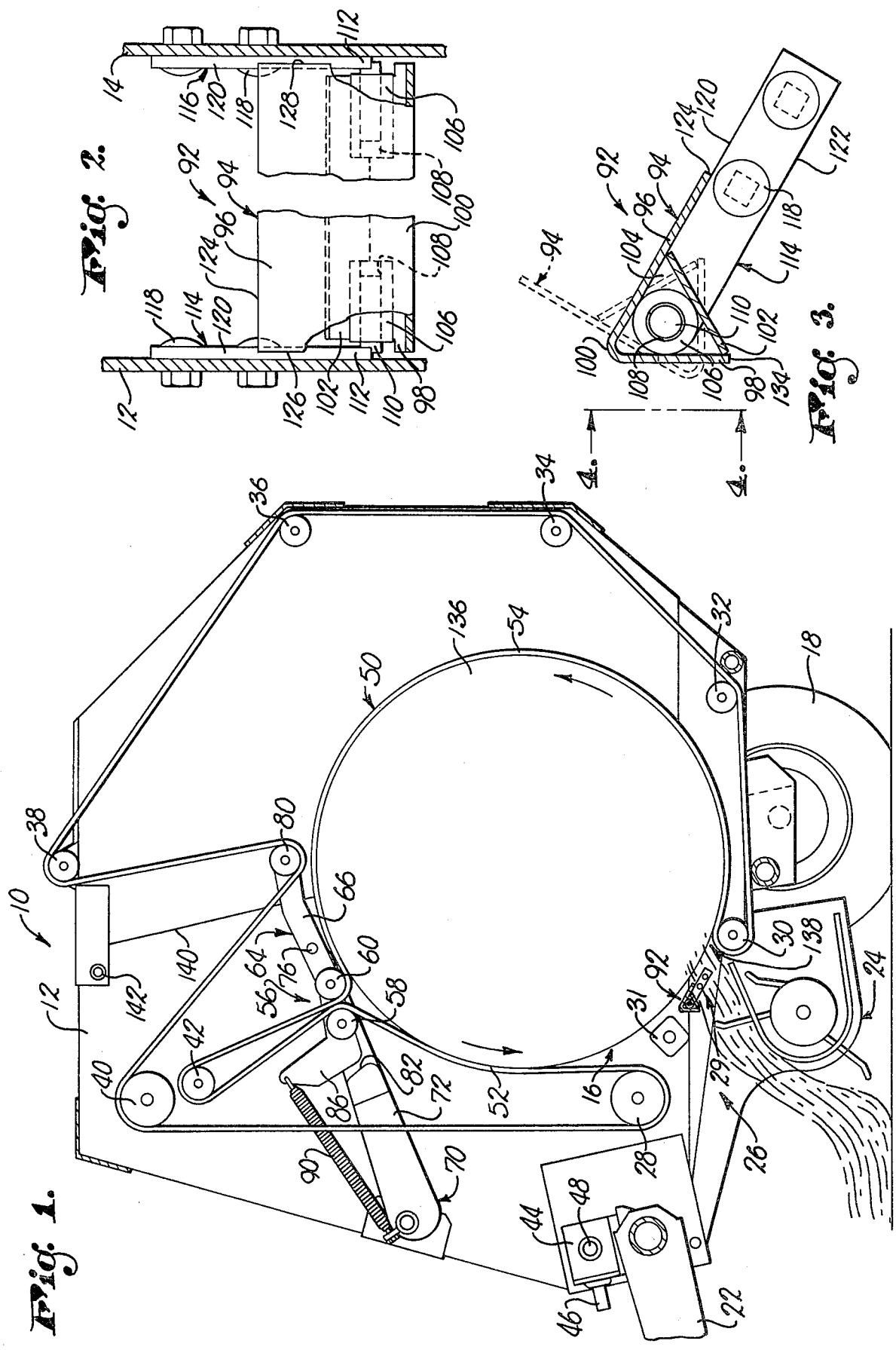

THROAT CONTROL APPARATUS IN AN OPEN THROAT, ROTARY BALER

TECHNICAL FIELD

This invention relates to crop balers of the type which coil materials into large cylindrical bales weighing 1500 lbs. or more. More particularly, it relates to a special crop flow control device positioned in the wide-open, crop inflow throat of a baler of the mentioned class utilizing a wide, unobstructed delivery throat to its baling chamber as opposed to a restricted throat employing compression or nip rollers to press the incoming crop flow into a thin mat before it is coiled up into a bale within the chamber.

BACKGROUND ART

Because of the wide-open nature of the feeding throat associated with balers of this type, in certain conditions there may be a tendency for the belts which coil up and pack the crop material to eject such material back out of the chamber through the open throat instead of coiling it up in the proper manner. This is particularly true in short, light crop materials such as wheat straw.

However, the benefits obtained through an open throat design, as opposed to a closed or constricted throat configuration in which a pair of compression or nip rollers are utilized, are so significant that it is desirable to maintain the unobstructed and unconstricted flow of materials into the baling chamber while somehow eliminating the retrograde flow or ejection action above referred to.

SUMMARY OF THE PRESENT INVENTION

Accordingly, the present invention is directed to the placement of a special control valve or gate within the entry throat of an open throat baler which is so located and configured that it will block retrograde outflow of crop materials from the chamber without impeding the continued, unrestricted inflow of such materials from the throat into the baling chamber. Furthermore, the gate is so designed that it accommodates the changing shape of the chamber as the bale grows in size, and the compression belt moving away from the throat shifts around from a generally vertical orientation to a more horizontally disposed position under the weight of the growing bale, this causing the stream of incoming crop material to actually progressively change directions from directly into the center of the chamber to rearwardly into the chamber beneath the growing bale and on top of the belt which departs from the throat. During such later stages of bale growth, even though the gate remains in its closed position in a transverse attitude with respect to the throat, the fact that the gate only partially spans the throat in that attitude enables the incoming crop material to flow rearwardly into the nip between the bale and the underlying belt while still preventing retrograde outflow of crop material from the other, oppositely moving belt. At this same time, the strategic location of the gate within the throat causes it to engage the lower peripheral portion of the growing bale and prevent outward sagging thereof down into the throat, which condition would otherwise interfere with proper feeding action to the baling chamber at such latter stage of bale growth.

BRIEF DESCRIPTION OF THE DRAWINGS

FIG. 1 is a fragmentary elevational view of a baler having the left sidewall thereof removed and employing a control gate in accordance with the principles of the present invention, the figure illustrating a bale which is approximately mid-way through the baling cycle thereof;

FIG. 2 is an enlarged fragmentary, substantially vertical plan view of the control device of the present invention;

FIG. 3 is a fragmentary, transverse cross-sectional view thereof;

DETAILED DESCRIPTION

Figure 4:
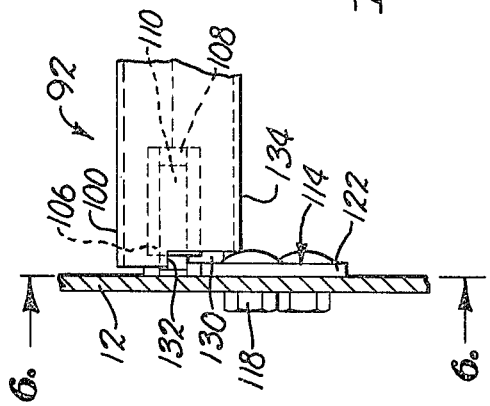
FIG. 4 is an enlarged fragmentary, vertical cross-sectional view through the baler taken substantially along line 4—4 of FIG. 3.
Figure 6:
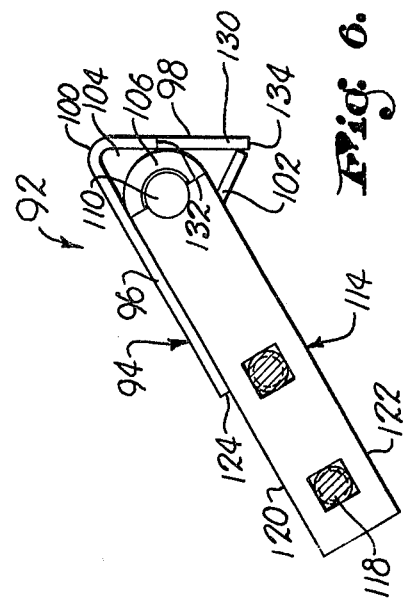
FIG. 6 is an enlarged side elevational view of the control device taken from the right side of the baler.

The baler 10 has a pair of laterally spaced apart sidewalls 12 and 14 that cooperate to provide the lateral extremities of a bale-forming chamber denoted broadly by the numeral 16. Although the positions of the sidewalls 12 and 14 relative to each other are fixed such that the lateral extremities or dimensions of the chamber 16 are likewise fixed, the vertical dimension of the chamber 16 as well as its fore-and-aft dimension is subject to change throughout the period that a bale is forming within the chamber 16 as will subsequently appear.

The sidewalls 12 and 14 are carried on a suitable chassis which is in turn carried by a pair of ground wheels 18 located on opposite sides of the baler 10 outboard of the respective sidewalls 12 and 14. A fore-and-aft extending tongue 22 located adjacent the front end of the baler 10 relative to its normal direction of travel adapts the same to be hitched behind a towing tractor or the like for advancement across a field having windrowed crop material deposited thereon. A pickup 24 spaced rearwardly from the front extremity of the sidewalls 12, 14 and located substantially directly beneath the chamber 16 is operable to pick up windrowed material from the field as the baler 10 passes over the same and to feed such material up into the chamber 16 through a wide-open, elongated feed throat 26 along and above the pickup 24 and between a pair of transversely extending rolls 28 and 30 spanning the sidewalls 12, 14 and located in fore-and-aft spaced relationship to one another. The throat 26 terminates at the chamber 16 is a bottom entrance 29 to the latter located between rollers 28 and 30. A cross-sectionally polygonal roller 31 spanning sidewalls 12, 14 and situated rearwardly adjacent front roll 28 keeps the bale off roll 28 during formation.

Also spanning the sidewalls 12, 14 are additional rolls arranged in a generally circular pattern progressing in a counterclockwise direction from the roll 30, such rolls being identified by the numerals 32, 34, 36, 38, 40 and 42. The rolls 30–38 and 42 are all idler rolls, while the roll 28 and optionally also the roll 40 are rotatively driven in a clockwise direction viewed in FIG. 1 by mechanism not illustrated. Such driving mechanism may take several different forms readily understood by those skilled in the art, and it is contemplated that a right angle gearbox 44 situated on top of the tongue 22 adjacent its rearmost end may be provided with an input shaft 46 ultimately couplable with the power-takeoff shaft (not shown) of the towing vehicle, the gearbox 44 also having an output shaft 48 at right angles to the input shaft 46 from which the driving mechanism abovementioned may receive its power for driving the roll 28 and optionally also the roll 40.

Figure 5:
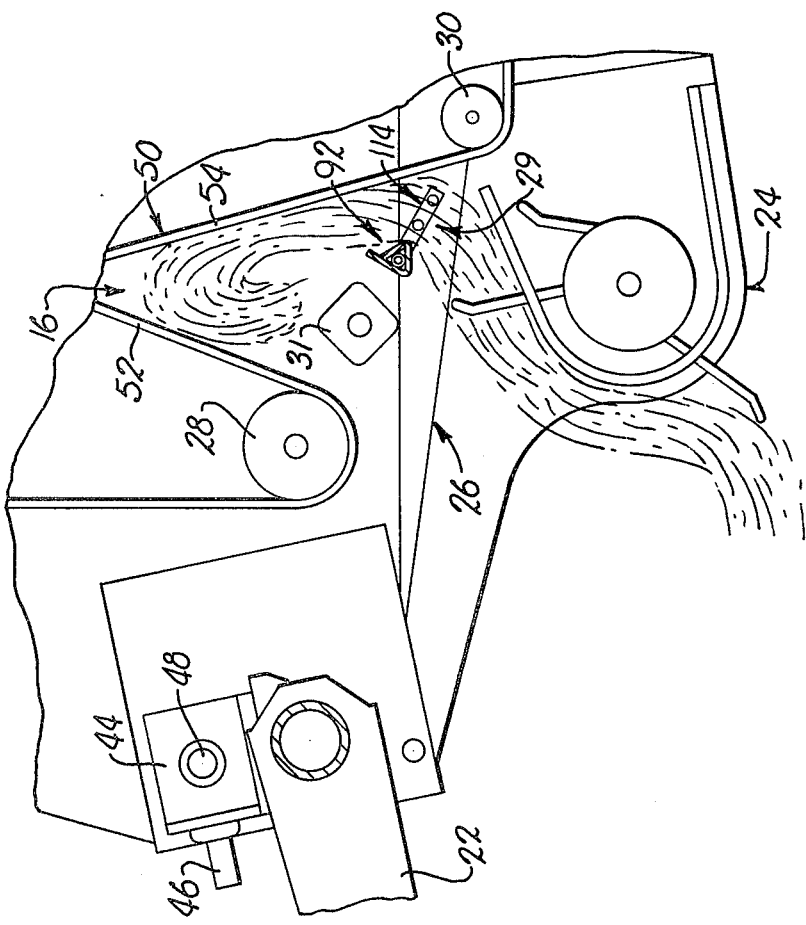
FIG. 5 is an enlarged, fragmentary elevational view similar to FIG. 1 showing the condition of components during bale start up.

The bale chamber 16 is further defined by structure in the form of an endless, flexible web broadly denoted by the numeral 50 which is looped over the roll 42 and under the rolls 28, 30 in such a manner as to present a pair of generally initially upright, opposed web stretches 52 and 54 which, as illustrated in FIG. 5, initially move in opposite vertical directions. The web stretches 52, 54 are held apart at their lower ends by the rolls 28, 30 such as to present the entrance 29, and the stretches 52, 54 are held close together at a location above the entrance 29 by a retaining device 56 in the nature of a pair of elongated, fore-and-aft spaced apart rollers 58, 60, thus effectively closing the periphery of the chamber 16 except at the entrance 29 thereof. The web 50 preferably takes the form of a series of endless, identical belts spaced a short distance apart across the baler 10 and between the sidewalls 12, 14.

The retaining device 56 and an associated lever assembly 64 are the subject of U.S. Pat. No. 4,252,057 issued Feb. 24, 1981 and form no part of the present invention per se. The rollers 58, 60 are supported on lever assembly 64 which has a pair of levers laterally spaced apart 66 (only one being shown) and spanned by the rollers 58, 60. The assembly 64 in turn is pivotally supported by an arm assembly 70 that includes a pair of arms 72 (only one being shown) situated slightly inboard of the respective sidewalls 12, 14. A pair of aligned pivots 76 (only one being shown) at the outermost ends of the levers 66 attach the lever assembly 64 to the arm assembly 70 and serve as the fulcrum point for the levers 66. Hence, it may be said that the retaining device 56 is located on one side of the fulcrum point of the lever assembly 64 while a slack-takeup roller 80 spanning the levers 66 at the opposite end thereof is located on the opposite side of the fulcrum point of lever assembly 64. As illustrated, the web 50 is looped beneath the takeup roller 80 after being looped over the rolls 38, 40.

A pair of stops 82 on the arms 72 are respectively disposed to abuttingly engage upwardly projecting shoulders 86 (only one being shown) on the proximal inner ends of the corresponding levers 66. Such abutting engagement of the stops 82 and the shoulders 86 serves to limit counterclockwise swinging of the lever assembly 64 about the pivots 76 relative to the arm assembly 70, and each of the shoulders 86 has a tension spring 90 (only one being shown) secured at one end thereto and at the opposite end to a remote point on the corresponding arm 72 for the purpose of yieldably biasing the shoulders 86 of lever assembly 64 against the stops 82 of arm assembly 70.

The arm assembly 70 is swingably mounted on the sidewalls 12, 14 adjacent the front of the latter for generally vertical swinging movement toward and away from the lower rolls 28 and 30, thereby also rendering the retaining device 56 likewise shiftable toward and away from lower rolls 28. Suitable spring biasing means (not shown) on the exterior of the baler 10 yieldably urge the arm assembly 70 down toward the lower rolls 28 and 30.

Pursuant to the present invention, a special valve-like gate 92 is strategically positioned within the throat 26 in order to permit unobstructed inflow of new crop material to the chamber 16 from the pickup 24, but to block the retrograde ejection of material from chamber 16 throughout the bale-forming process. As shown, the gate 92 is positioned between the rolls 28, 30 at entrance 29 and, more particularly, between the polygonal roll 31 and the belt roll 30.

Details of the gate 92 are shown most clearly in FIGS. 2, 3, 4 and 6, wherein it may be seen that gate 92 comprises in part a generally L-shaped member 94 spanning the entire distance between the sidewalls 12, 14 and including a long leg 96 and a shorter leg 98 integrally joined at an apex 100. Preferably, at least the leg 96 is imperforate in the nature of a solid sheet or panel, although a rod or grid-like configuration for the leg 96 is also acceptable, but to somewhat of a lesser extent than an imperforate surface for the leg 96. A bracing connector piece 102 spans the legs 96 and 98 at a point remote from the apex 100 and is securely attached to the legs 96, 98 such as by welding. The connector 102 extends substantially the full length of the member 94 to cooperate with the legs 96 and 98 in defining a triangularly shaped enclosure broadly denoted by the numeral 104. At opposite ends of the enclosure 104 are located a pair of identical sleeves 106 which are securely welded in place within the enclosure 104 and have their longitudinal axes coinciding with the longitudinal axis of enclosure 104. Each of the sleeves 106 has an internal bore 108 therethrough.

The sleeves 106 form part of what may broadly be termed mounting means for the gate 92. Additional components of the mounting means includes a pair of identical pintles 110 rotatably received within the bores 108 of respective ones of the sleeves 106. The pintles 110 are in turn rigidly secured to and project laterally outwardly from the ends 112 of a pair of mounting bars 114 and 116 attached to respective sidewalls 12, 14 by suitable fasteners 118. Each of the mounting bars 114, 116 lies with its longitudinal axis inclined downwardly and rearwardly with respect to the normal direction of travel of the baler 10 and is provided with parallel, upper and lower edges 120 and 122 respectively. The upper edge 120 lies generally along an imaginary line leading from the upper periphery of the roll 31 to the upper periphery of the tailgate roll 30.

The pintles 110 adapt the gate 92 for swinging movement between a lower, closed position as illustrated in solid lines by FIG. 3, and a raised open position as illustrated by broken lines in that same figure. Such swinging movement encompasses an arc of approximately 90 degrees, and it will be noted that when the gate 92 is in its closed position, the leg 96 of the member 94 extends slightly downwardly and rearwardly in parallelism with the top edge 120 of the mounting bars 114, 116 while, on the other hand, when the gate 92 is in its opened position, the leg 96 projects upwardly and rearwardly at right angles to the upper edges 120 of the mounting bars 114, 116. Such upper and lower edges 120, 122 serve as positive mechanical limit stops for swinging of the gate 92 by virtue of the construction shown most clearly in FIGS. 2, 4 and 6.

In this regard, the member 94, for the entire width of the leg 96 thereof from leading edge 124 to the apex 100, is long enough that its opposite ends 126 and 128 overlap the top edges 120 of the mounting bars 114, 116. Consequently, when the gate 92 is in its closed position, the ends 126, 128 of leg 96 rest upon the top edges 120 of mounting bars 114, 116.

On the other hand, the leg 98 is the same length as the leg 96 (measured across the baler 10) only from the apex 100 to an angular cutout 130 which extends from a point 132 outwardly to the end 134 of the leg 98. Thus, the cutout 130 serves to clear the mounting bars 114, 116 as the gate 92 swings to its opened position, whereupon the point or edge 132 abuttingly engages the lower edge 122 of the bars 114, 116 to limit such upward swinging of the gate 92.

OPERATION

As illustrated in FIG. 5, during forward movement of the baler 10, crop material is picked up by the pickup 24 and fed upwardly through the throat 26 and into the chamber 16 via the bottom entrance 29. Initially, the belt stretches 52, 54 are essentially upright with the rear stretch 54 moving upwardly and the front stretch 52 moving downwardly as shown.

The gate 92 remains in its closed position with leg 96 resting upon the top edges 120 of mounting bars 114, 116 until such time as the inflowing crop material engages the extended leg 96 and causes the gate 92 to flip open as shown in FIG. 5. The force of the upwardly moving crop material, assisted by the action of the upwardly moving belt stretch 54, causes the gate 92 to remain in such opened position as the entering crop materials are acted upon by the countermoving forces of the belt stretches 52 and 54. This action causes the material within the chamber 16 to begin tumbling, whereupon a coiling effect is initiated as newly-added material becomes layered onto the outer periphery of the bale core, and the material is compacted by the belt stretches 52, 54.

It is to be noted that while the upwardly moving belt stretch 54 is directed generally away from the throat 26 and entrance 29 and thus has little tendency to force materials back down the entrance 29, the downwardly moving belt stretch 52 is generally directed toward the entrance 29 so as to have somewhat of a contrary action to the lifting effect of the rear belt stretch 54. Particularly in short, light crops such as wheat straw, it has been found that straw particles may be of insufficient length to begin coiling properly and, instead, have a tendency to be impelled downwardly or ejected from the chamber 16 by the downwardly moving belt stretch 52.

However, with the gate 92 in place, the upper leg 96 thereof is always in position to block and obstruct such attempted ejection of the crop particles by the downwardly moving front stretch 52 so as to divert such errant particles back up into the chamber 16 for inclusion within the rolling core of material. Thus, in the earliest stages of bale formation, the upper leg 96 of the gate 92 is directed generally upwardly in the same general attitude as the rear belt stretch 54 so as to divert and redirect errant materials up to and along the rear belt stretch 54 for receiving the lifting and tumbling action which is imparted therefrom.

On the other hand, as illustrated in FIG. 1, during the latter stage in the baling process, the bale 136 comes to rest upon the gate 92 at the lower peripheral portion of the bale 136 whereby to cause the latter to swing downwardly to the extent permitted by the mounting bars 114, 116. In this condition, the leg 96 is again compatible with the generally rearwardly directed attitude of the rear belt stretch 54 such that any crop particles tending to be ejected by the downwardly moving front stretch 52 are diverted rearwardly to the rearwardly moving stretch 54. Furthermore, it is to be noted that as the bale 136 begins taking shape so as to rest upon the aggressive polygonal roller 31, the gate 92 and the tailgate roll 30, incoming crop materials enters the chamber 16 at a nip area 138 formed between the lower periphery of the bale 136 and the roller 30 or rear belt stretch 54. This nip area 138 has the effect of pulling in the incoming crop material in a forceful drawing action, and such flow is fully permitted, even though the gate 92 is closed, because the gate 92 does not fully span the throat 26 but instead has the leading edge 124 of upper leg 96 spaced forwardly from the roll 30.

Because of the strategic location of the gate 92 during the later stages of bale formation, it not only prevents ejection of errant crop particles, but also serves to prevent sagging down of the lower periphery of the bale into the throat area 26 through the entrance 29. Such sagging has a tendency to constrict the nip area 138 in a vertical dimensional sense to thereby become less receptive to the incoming crop materials. Consequently, by maintaining the nip area 138 properly open and receptive, incoming crop flow is carried out smoothly without a clogging or jamming up of the entrance 29 due to the inability of the nip area 138 to receive the incoming material at the feed rate established by pickup 24.

As is well understood by those skilled in the art, the belt stretches 52, 54 maintain compactive pressure against the bale 136 as they roll the same within the chamber 16. As the bale 136 presses radially outwardly against the belt stretches 52, 54 during formation, the arm assembly 70 swings upwardly within the baler 10 to pay out additional belt lengths under resistance from the tension springs (not shown) which control the arm assembly 70. When the bale 136 reaches full size, the rear half of the baler 10 may be opened along a parting line 140 by suitable mechanism not shown so as to swing about an upper pivot 142 in a clam shell-like action. This permits the finished bale 136 to be ejected from the baler 10. If desired, the bale may first have been wrapped with twine by apparatus not shown in order to assist in maintaining the integrity of the bale once it leaves the baler 10.

I claim:

1. In a rotary baler having an internal chamber in which crop material is coiled into a cylindrical bale by coacting, oppositely moving surfaces respectively directed generally toward and away from an open noncompactive crop supply throat leading to and communicating with said chamber, the improvement comprising:

a one-way control gate operably associated with said throat; and means mounting said gate for moving actuation by incoming crop material from a first position partially spanning the throat to an open position blocking retrograde crop flow from the chamber while permitting inwardly directed crop flow thereto.

2. In a rotary baler as claimed in claim 1, wherein said mounting means includes a pivot adapting the gate for swinging movement to said open position.

3. In a rotary baler as claimed in claim 2, wherein said gate is located adjacent the extremity of said chamber in disposition to engage a peripheral portion of the bale during formation thereof to prevent sagging of such portion into the throat.

4. In a rotary baler as claimed in claim 2, wherein said gate only partially spans the throat, having a terminal end remote from said pivot which is spaced from the opposite extremity of the throat to permit flow into the chamber without movement of the gate to said open position.

5. In a rotary baler as claimed in claim 2, wherein said gate is gravity-biased away from said open position thereof, said mounting means further including stop means limiting gravity-biased movement of the gate to a closed position at least partially spanning the throat.

6. In a rotary baler as claimed in claim 5, wherein said chamber is provided with a pair of spaced apart members adjacent the junction of said throat with the chamber, said oppositely directed surfaces comprising portions of oppositely driven web means looped about respective ones of said members and respectively moving generally toward and away from the gate, said gate being positioned generally between said members in a manner to prevent retrograde crop flow from the web means moving generally toward the gate while permitting crop flow inwardly toward the other web means moving generally away from the gate.

7. In a rotary baler having a baling chamber provided with a crop entrance thereto, said chamber being so configured and arranged that during the baling operation the periphery of the forming bale normally travels generally across the entrance from one side to the other side thereof in a direction generally transverse to the direction of incoming crop material, the improvement comprising:

a gate;

means mounting said gate at said entrance for movement between a first position in which the gate projects in a direction extending across the entrance from said one side toward said other side thereof and a second position in which the gate projects in general alignment with the direction of incoming crop flow through the entrance; and stop means for preventing reverse movement of said gate beyond said first position thereof, said gate being movable by incoming crop material to said second position during the initial start-up portion of the baling operation and then being maintainable in said first position by the periphery of the forming bale during subsequent portions of the baling operation, said gate being so dimensioned as to extend only partially across said entrance when the gate is in said first position thereof whereby to prevent retrograde movement of crop materials from the chamber along said one side of the entrance without blocking the inflow of crop material to the chamber along said other side of the entrance.

8. In a rotary baler as claimed in claim 7, wherein said mounting means includes pivot structure adapting the gate for swinging movement between said positions thereof.

9. In a rotary baler as claimed in claim 7, wherein said gate is imperforate across crop-blocking portions thereof.

10. In a rotary baler as claimed in claim 7, wherein said gate is gravity-biased toward said first position thereof.

* * * * *